(12) United States Patent
Dunklau

(10) Patent No.: US 6,695,550 B2
(45) Date of Patent: Feb. 24, 2004

(54) CUTTING TIP

(75) Inventor: Claus Dunklau, Aichwald (DE)

(73) Assignee: CeramTec AG Innovative Geramic Engineering, Plochingen (DE)

( * ) Notice: Subject to any disclaimer, the term of this patent is extended or adjusted under 35 U.S.C. 154(b) by 0 days.

(21) Appl. No.: 09/775,661

(22) Filed: Feb. 5, 2001

(65) Prior Publication Data

US 2002/0034425 A1 Mar. 21, 2002

(30) Foreign Application Priority Data

| Feb. 5, 2000 | (DE) | 100 05 268 |
| May 6, 2000 | (DE) | 100 22 199 |
| Jul. 25, 2000 | (DE) | 100 36 464 |
| Aug. 22, 2000 | (DE) | 100 41 023 |

(51) Int. Cl.[7] ............................. B23B 27/22; B23C 5/20
(52) U.S. Cl. .................................. 407/114; 407/116
(58) Field of Search ........................... 407/113, 114, 407/115, 116, 117

(56) References Cited

U.S. PATENT DOCUMENTS

| 4,556,345 A | * | 12/1985 | Philippi | 407/114 |
| 4,606,679 A | * | 8/1986 | Jeremias | 407/114 |
| 4,776,732 A | * | 10/1988 | Hale | 407/114 |
| 5,032,050 A | * | 7/1991 | Niebauer et al. | 407/114 |
| 5,720,583 A | * | 2/1998 | Bohnet et al. | 407/113 |
| 5,915,889 A | * | 6/1999 | Kress et al. | 407/114 |
| 5,971,672 A | * | 10/1999 | Hansson | 407/113 |
| 6,244,791 B1 | * | 6/2001 | Wiman et al. | 407/114 |

* cited by examiner

Primary Examiner—Erica Cadugan
Assistant Examiner—Dana Ross
(74) Attorney, Agent, or Firm—Antonelli, Terry, Stout & Kraus, LLP

(57) ABSTRACT

The invention relates to a reversible cutting plate made from ceramic material for chucking in a cutting tool for machining cast materials, with each corner of the reversible cutting plate (9) having a minor cutting edge (5*a*, 5*b*, 5*c*, 5*d*) and a major cutting edge (4*a*, 4*b*, 4*c*, 4*d*).

In order to remove cast-material shavings from the cutting edge, it is proposed that the corners of the reversible cutting plate (9) be ground, pressed or injected into approximately ¼ of the diagonal plane (D) and form a triangular face (3) and the triangular face (3) have at least one incline.

13 Claims, 3 Drawing Sheets

CUTTING TIP

BACKGROUND OF THE INVENTION

The invention relates to a reversible cutting plate made from ceramic material for chucking in a cutting tool for machining cast materials.

A reversible cutting plate made from ceramic material for chucking in a cutting tool for machining cast materials, in particular cast iron, is known from EP 0 075 177. On its surface, the cutting plate contains a star-shaped depression with four points for the engagement of a chucking claw or a clamping finger of the cutting tool, with each corner of the reversible cutting plate having a minor cutting edge and a major cutting edge.

The cutting tool accordingly consists of a clamping holder and an exchangeable cutting plate that is to be inserted into the clamping holder. The cutting plate is that part which acts on the work piece and machines the latter. The cutting plate must therefore be made from an extremely hard material which abrades to a minimum extent when machining metal work pieces.

Materials that satisfy these requirements are oxide-ceramic materials, such as, for example, aluminium oxide or zirconium oxide. Such ceramic materials have a very high level of hardness and pressure resistance, yet only limited tensile strength.

SUMMARY OF THE INVENTION

The underlying object of the invention is to improve a reversible cutting plate in such a way that shavings from the cast-material are removed from the cutting edge and, as a result, the cutting edge is relieved.

In accordance with the invention, this object is achieved by grinding, pressing or injecting the corners into approximately ¼ of the diagonal plane and thus forming a triangular face or shaving-forming shoulder and the triangular face having at least one incline. As a result, the shavings of cast material are removed from the cutting-edge corner towards the centre of the cutting plate and thereby relieve the cutting edge. A positive shaving-forming shoulder is created by means of these measures.

In a preferred embodiment, the triangular face is inclined at an angle a from the minor cutting edge in the direction of the side centre.

An alternative embodiment is characterised in that the triangular face is divided into two partial faces by the diagonal and at least one partial face is inclined from the major cutting edge or the minor cutting edge respectively at right angles, at an angle a towards the centre of symmetry. Advantageously, both partial faces are inclined towards the centre of symmetry. The centre of symmetry is understood as the point of intersection of the diagonals of the cutting plate with the hypotenuse of the triangular face.

The angle $\alpha$ preferably lies between 3 and 12°. For example, with a plate thickness d of 5 mm, a preferred maximum drop x of 1.5 mm results.

In accordance with the invention, the minor cutting edges are preferably provided with a planar supporting surface at their outer edge, which planar supporting surface, when the cutting plate is turned, relieves the major cutting edge located on the other side.

A significant feature of the invention is that the cutting plate is formed as a reversible cutting plate, with the minor cutting edges and major cutting edges being arranged on the two sides in such a way that they are offset by 90° in each case so that one major cutting edge on the one side lies opposite one minor cutting edge on the other side and vice versa. As a result of the planar supporting surface along the minor cutting edge, the major cutting edge is thus supported on the other side. The planar supporting surface preferably extends over the entire length of the minor cutting edge and is of a width of preferably 1 mm.

Each corner is subdivided into two triangles by the associated diagonal. In the plan view of an upper side, viewed in the clockwise direction, the major cutting edge is arranged in front of the diagonal and the minor cutting edge is arranged behind the diagonal. This applies to cutting plates that rotate from left to right. For cutting plates that rotate from right to left, it is the reverse.

In one preferred embodiment the cutting plate has, for the purpose of securing the cutting plate in the cutting tool, a star-shaped depression with four points, with the points each being aligned with respect to the centre of one longitudinal side. A clamping finger of a chucking claw of the cutting tool engages into the depression in such a way that it is fixed in its position.

In accordance with the invention, all four corners of an upper side of the cutting plate can be used for cutting purposes. An identical depression is arranged on the rear side of the cutting plate so that eight corners are available in all for cutting purposes.

In an alternative embodiment, a hole is arranged in the cutting plate for the engagement of a gripping bolt of the cutting tool instead of the depression.

Apart from the corners which are formed in accordance with the invention, the reversible cutting plate can also have a smooth surface. These cutting plates are also termed smooth cutting plates.

BRIEF DESCRIPTION OF THE DRAWINGS

Further features follow from the figures which are described in the following and in which.

DETAILED DESCRIPTION OF THE PREFERRED EMBODIMENTS

Figure 1A:
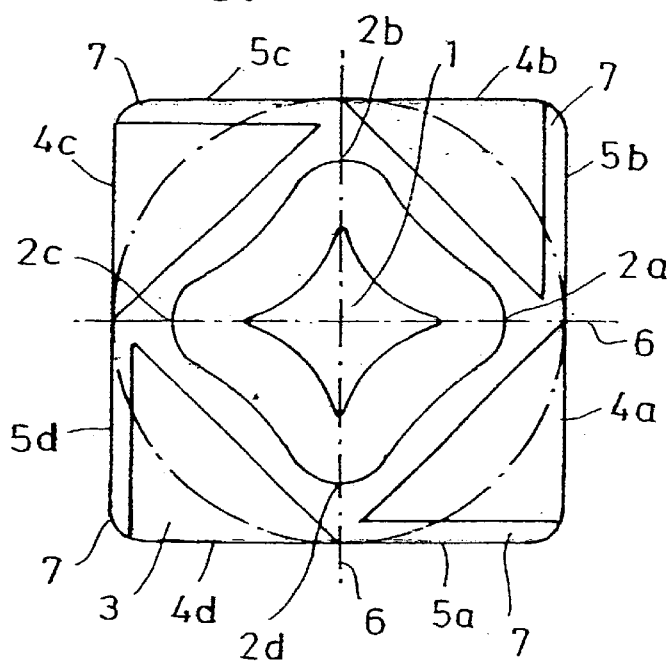
FIGS. 1a, b, c show a reversible cutting plate in accordance with the invention viewed from above, below and from the side.
Figure 1B:
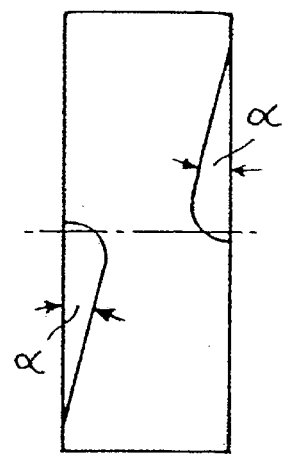

FIG. 1a shows one side of a reversible cutting plate with a star-shaped depression 1 with four points 2a, 2b, 2c, 2d which are aligned with respect to the centre 6 of a respective longitudinal side. The depression 1 is shaped in such a way that one clamping finger of a clamping claw of a cutting tool fixes the reversible cutting plate in the cutting tool in chucking contact (see FIG. 4 in this connection).

The corners of the reversible cutting plate are each ground in or pressed in and form a shaving-forming shoulder in the form and configuration of a triangular face 3. In the following, the major cutting edges are denoted by the reference symbols 4a, 4b, 4c, 4d and the minor cutting edges are denoted by the reference symbols 5a, 5b, 5c, 5d. In this connection, considerations are based on a plate that rotates from left to right.

Figure 1C:
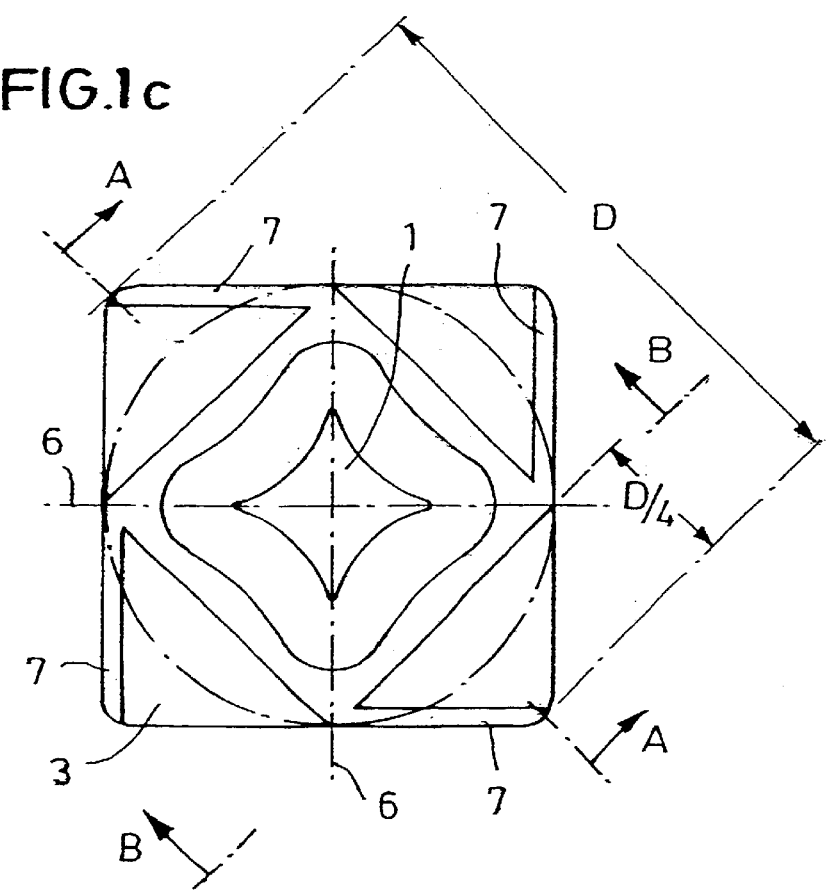

Viewed from one corner, the shaving-forming shoulder or triangular face 3 extends into the cutting plate up to approximately ¼ of the length of the diagonals D of the plate (see FIG. 1c).

Figure 3:
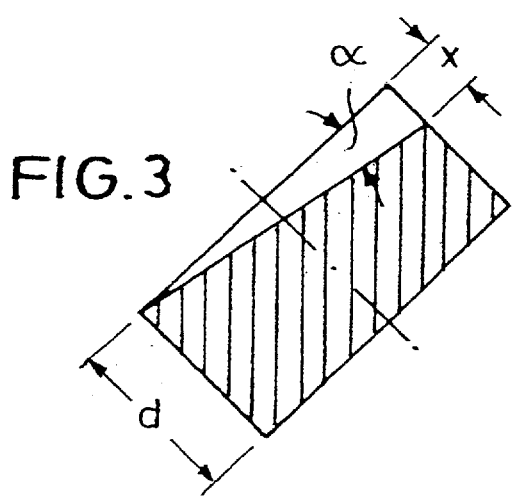
FIG. 3 shows a section along the line B—B in FIG. 1c.

The shaving-forming shoulder 3 thereby forms a triangular face which is inclined from the minor cutting edge 5a, 5b, 5c, 5d in the direction of the side centre 6 at an angle α. This angle α lies between 3 and 12°, preferably between 8 and 12°. In this specific case, the angle α is 11° (see also FIG. 3 in this connection).

FIG. 1c shows the reversible cutting plate in accordance with FIG. 1a from the underside. When comparing FIGS. 1a and 1c it is easy to see that the minor cutting edges 5a, 5b, 5c, 5d and major cutting edges 4a, 4b, 4c, 4d are arranged on the two sides of the reversible cutting plate in such a way that they are staggered by 90° in each case so that one major cutting edge 4a, 4b, 4c, 4d on the one side lies opposite one minor cutting edge 5a, 5b, 5c, 5d on the other side.

In order to support the major cutting edges 4a, 4b, 4c, 4d, the minor cutting edges 5a, 5b, 5c, 5d are provided with a planar supporting surface 7 at their outer edge, which planar supporting surface 7 relieves the major cutting edge 4a, 4b, 4c, 4d located on the other side of the cutting plate when in use.

Figure 2:
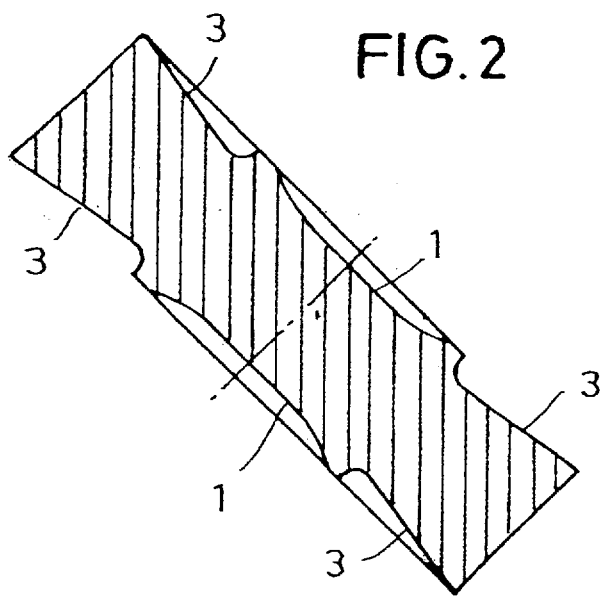
FIG. 2 shows a section along the line A—A in FIG. 1c.

FIG. 2 shows a section along the line A—A in FIG. 1c.

Figure 4:
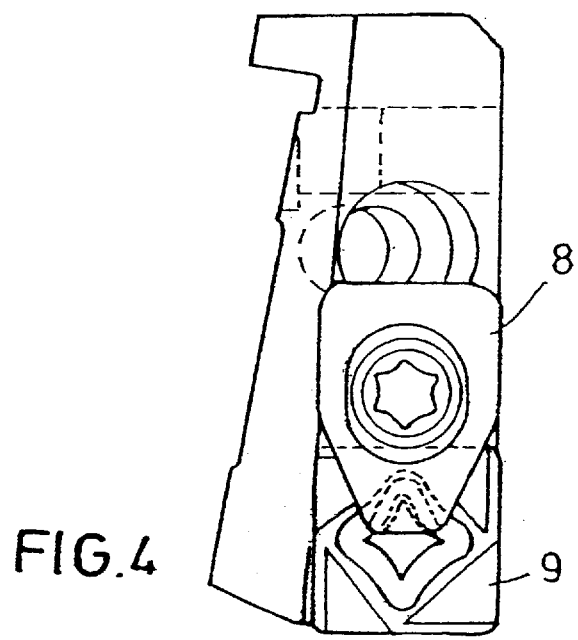
FIG. 4 shows a view of a clamping holder with a reversible cutting plate inserted in accordance with the invention.

FIG. 4 shows the view of a clamping holder with a gripping claw 8 which fixes a reversible cutting plate 9 in accordance with the invention in a chucking manner. The gripping angle in this embodiment amounts to −8° and the angle of inclination to −7°.

Figure 5A:
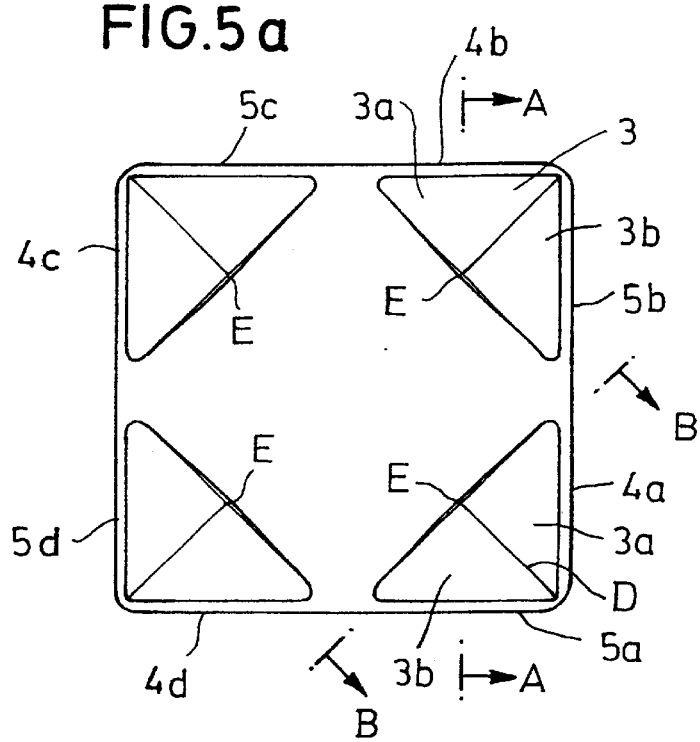
FIGS. 5a, b, c, d show a reversible cutting plate in accordance with the invention having two inclined partial faces of the triangular face.
Figure 5B:
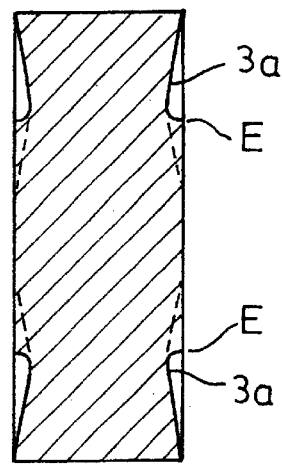
Figure 5D:
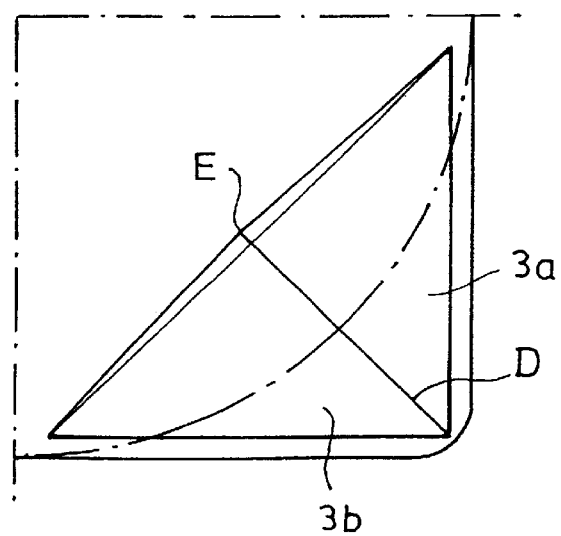
Figure 5C:
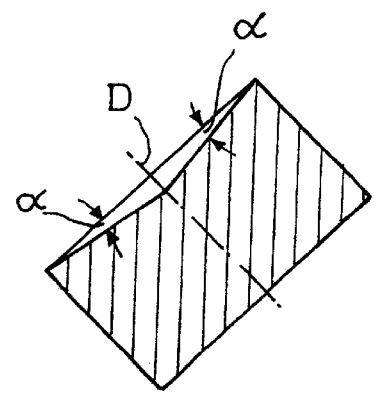

FIGS. 5a–d show a reversible cutting plate in accordance with the invention in which the triangular face 3 is divided into two partial faces 3a, 3b by the diagonal D. In order to remove shavings, the two partial faces are inclined from the major cutting edge (4a, 4b, 4c, 4d) or the minor cutting edge (5a, 5b, 5c, 5d) respectively at right angles, at an angle α towards the centre of symmetry E. FIG. 5d shows a corner of the cutting plate on an enlarged scale. FIG. 5b shows a section along the line A—A of FIG. 5a, and FIG. 5c shows a section along the line B—B of FIG. 5a. The angle α of the two inclines in this case lies at 3°. However, other angles can also be used if sufficient shavings-removal is guaranteed thereby.

What is claimed is:

1. Reversible cutting plate made from ceramic material for chucking in a cutting tool for machining cast materials, the reversible cutting plate having first and second opposed major surfaces, with each corner of each major surface of the reversible cutting plate having a minor cutting edge and a major cutting edge, characterised in that the corners of each major surface of the reversible cutting plate are ground, pressed or injected to form a triangular face, at least one edge of the triangular face being defined by a major cutting edge, the triangular face having at least one incline, and the triangular face extends into the cutting plate a distance along a diagonal of the major surface of approximately one quarter of a length of the diagonal of the major surface wherein the minor cutting edges are provided with a planar supporting surface along their lengths at their outer edges.

2. Reversible cutting plate according to claim 1, characterised in that the triangular face is inclined at an angle α from the minor cutting edge in the direction of the centre of the side.

3. Reversible cutting plate according to claim 2, characterised in that the angle α lies between 3° and 12°.

4. Reversible cutting plate according to claim 1, characterised in that the triangular face is divided by the diagonal into two partial faces and at least one partial face is inclined from the major cutting edge or the minor cutting edge respectively at right angles, at an angle α towards the centre of symmetry.

5. Reversible cutting plate according to claim 4, characterised in that both partial faces are inclined towards the centre of symmetry.

6. Reversible cutting plate according to claim 4, characterised in that an angle α lies between 3° and 12°.

7. Reversible cutting plate according to claim 1, characterised in that for cutting plates that rotate from right to left in the plan view of one side of the reversible cutting plate, viewed in the clockwise direction, the major cutting edge is arranged in front of the diagonal and the minor cutting edge is arranged behind the diagonal and this is the reverse for cutting plates that rotate from left to right.

8. Reversible cutting plate according to claim 1, characterised in that a depression is arranged on each side of the reversible cutting plate for the engagement of a chucking claw of the cutting tool.

9. Reversible cutting plate according to claim 8, characterised in that the depression is formed in the shape of a star and has four points.

10. Reversible cutting plate according to claim 9, characterised in that the points of the depression are aligned with respect to the center of the longitudinal sides.

11. Reversible cutting plate according to claim 1, characterised in that a hole is arranged in the reversible cutting plate for the engagement of a chucking bolt of the cutting tool.

12. Reversible cutting plate according to claim 1, characterised in that apart from the corners that are formed in accordance with the invention, the reversible cutting plate has a smooth surface.

13. Reversible cutting plate made from ceramic material for chucking in a cutting tool for machining cast materials, the reversible cutting plate having first and second opposed major surfaces, with each corner of each major surface of the reversible cutting plate having a minor cutting edge and a major cutting edge, characterised in that the corners of each major surface of the reversible cutting plate are ground, pressed or injected to form a triangular face, at least one edge of the triangular face being defined by a major cutting edge, the triangular face having at least one incline, the triangular face extends into the cutting plate a distance along a diagonal of the major surface of up to approximately one quarter of a length of the diagonal of the major surface, and in that the minor cutting edges and major cutting edges are arranged on the first and second major surfaces of the reversible cutting plate in such a way that they are staggered by 90° so that one major cutting edge on the first major surface lies opposite one minor cutting edge on the second major surface and vice versa wherein the minor cutting edges are provided with a planar supporting surface along their lengths at their outer edges.

* * * * *